United States Patent [19]

Wu

[11] Patent Number: 5,446,957
[45] Date of Patent: Sep. 5, 1995

[54] APPARATUS AND METHOD FOR FORMING A VEHICLE PANEL HAVING A PREPLUGGED

[75] Inventor: Yitah R. Wu, Dearborn, Mich.

[73] Assignee: Ford Motor Company, Dearborn, Mich.

[21] Appl. No.: 155,261

[22] Filed: Nov. 22, 1993

[51] Int. Cl.6 ............................................. B23P 17/00
[52] U.S. Cl. ............................ 29/424; 29/432.2; 29/423; 29/527.1; 411/180; 411/431
[58] Field of Search ............... 29/432.2, 522.1, 423, 29/424, 527.1, 798; 411/3, 179, 377, 901, 907, 908, 180, 431

[56] References Cited

U.S. PATENT DOCUMENTS

| | | | |
|---|---|---|---|
| 3,661,291 | 5/1972 | Hetzer | 220/42 B |
| 3,704,507 | 12/1972 | Grube | 29/417 |
| 4,124,050 | 11/1978 | Ackerman | 29/798 |
| 4,186,645 | 2/1980 | Zaydel | 411/908 X |
| 4,490,083 | 12/1984 | Rebish | 411/907 X |
| 4,900,206 | 2/1990 | Kazino et al. | 411/377 |
| 4,938,378 | 7/1990 | Kraus | 220/307 |
| 4,953,742 | 9/1990 | Kraus | 220/367 |
| 4,971,499 | 11/1990 | Ladouceur | 411/179 |
| 5,356,255 | 10/1994 | Takahashi et al. | 411/431 |

*Primary Examiner*—S. Thomas Hughes
*Attorney, Agent, or Firm*—Daniel M. Stock; Roger L. May

[57] ABSTRACT

A preplugged nut is attachable to a vehicle panel for fastening a component to the vehicle panel. The nut has a body with an opening for receiving a bolt to fasten the component to the panel and a plug in the body opening sealing the opening to prevent ingress of moisture, dust, fumes and other contaminants to the panel through the body opening. A method for forming a vehicle panel with the preplugged fastener includes forming the vehicle panel, forming a nut having a body opening for receiving a bolt to fasten the bracket to the panel, forming a plug, inserting the plug into the body opening of the nut and plugging the body opening to thereby prevent ingress of contaminants through the panel to the body opening after the nut is installed, and fastening the nut to the vehicle panel with the bolt.

3 Claims, 2 Drawing Sheets

5,446,957

APPARATUS AND METHOD FOR FORMING A VEHICLE PANEL HAVING A PREPLUGGED

FIELD OF THE INVENTION

The present invention relates generally to automotive manufacturing and, more particularly, to a method and apparatus for manufacturing a vehicle panel for attachment of optional or accessory components.

BACKGROUND OF THE INVENTION

In automotive manufacturing, it is necessary to provide accessory components to accommodate demand for such equipment. To efficiently utilize materials, automotive manufacturers use mass production techniques wherein a single component is designed for use on many different products by making adaptations for particular products and provisions for various optional or accessory equipment. There are occasions where a fastener is required for attaching an optional or accessory item or for attaching a bracket for mounting a particular item. Typically, the location of the fastener, if needed, will be known and the structural member of the automobile is adapted for adding it. Automobiles are constructed using sheet metal of various thicknesses and configurations which sometimes remains as a sheet and sometimes is formed into a channel or a box configuration for the particular purpose needed. A member may be pre-punched with openings at each location where a bracket or other component may be added at some point during the manufacturing process.

One method of attaching a bracket for fastening accessory equipment to a vehicle panel involves the use of a piercenut which pierces the metal panel and attaches itself to the panel for receiving a fastener that will attach the bracket to the panel. In the past, it was common to attach the piercenuts during assembly at each point on a panel that a nut may be required. Unfortunately, attaching a piercenut provides a passageway for the ingress of moisture and other contaminants which could corrode or otherwise damage the panel to which it attaches as well as damage other parts of the vehicle. Accordingly, it will be appreciated that it will be highly desirable to have a fastener nut that attaches to a vehicle panel without deteriorating the panel or panel integrity because of the ingress of contaminants.

Another method of attaching a bracket involves the use of a nut which attaches to the panel by clinching or crimping the panel. Such a nut may also attach to the vehicle panel with protrusions extending through an existing panel opening that are bent or crimped against the panel. Currently, there are several types of fasteners that are used, such as push nuts, sealed metal rivet nuts, solid piercenuts, and conventional piercenuts. Each of these fasteners has drawbacks. Plastic push nuts have a plastic substrate which severely limits the torque and loading that the plastic nut can withstand. Sealed rivet nuts require increased packaging space and installation is usually a manual process. Solid piercenuts must be drilled at assembly which is not an acceptable method for original equipment manufacturing because of increased production time.

In automotive applications, there are also occasions where a fastener is required on a panel on an as needed basis. When this fastener goes into a wet area, sealing is required because the hole in the fastener nut is a hole that contaminants can flow through in the panel to cause damage. Conventional piercenuts are usually plugged with a rubber plug that is manually added after installation with inherent installation inconsistencies. Accordingly, it will be appreciated that it will be highly desirable to have a fastener that can be added to a vehicle panel during manufacturer of the panel or during vehicle assembly that would function effectively as a fastener and would inhibit the ingress of water, corrosive atmospheric elements and other contaminants.

SUMMARY OF THE INVENTION

The present invention is directed to overcoming one or more of the problems set forth above. Briefly summarized, according to one aspect of the present invention, a nut for fastening an attaching member to a panel of a vehicle comprises a body having an opening for receiving a fastener member to fasten the attaching member to the panel, means on the body for attaching to the panel and fastening the body to the panel, and a plug in the body opening sealing the opening and preventing ingress of contaminants to the panel through the body opening. The nut may pierce or crimp the panel to attach itself thereto, or engage the vehicle panel about an opening in the vehicle panel to attach itself to the panel. The nut may be either a threaded or nonthreaded member with a plug in the opening to prevent the entrance of water and other contaminants.

According to another aspect of the invention, a method for forming a vehicle panel with a preplugged fastener for selectively attaching a vehicle component to the panel comprises forming the vehicle panel with an area for attaching the fastener to the panel, forming a nut having a body opening for receiving a fastener member to fasten the component to the panel, forming attaching means on the nut body for attaching the nut to the panel, forming a plug, inserting the plug into the body opening of the nut and plugging the body opening to thereby prevent ingress of contaminants to the panel through the body opening when the nut is installed, and fastening the nut body to the panel with the attaching means after inserting the plug.

The present invention solves the problem of ingress of moisture and other contaminants by providing a preplugged nut. The nut may be sent to stamping plants in coils with either a plastic plug such as a continuous molded plug, already inserted, or with a sealer injected into the nut opening. Both threaded or nonthreaded nuts may be used, although threaded nuts are better for retaining plugs. At assembly, the plug may be pried out of the hole with a simple tool, or the fastener may force the plug out of the hole.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
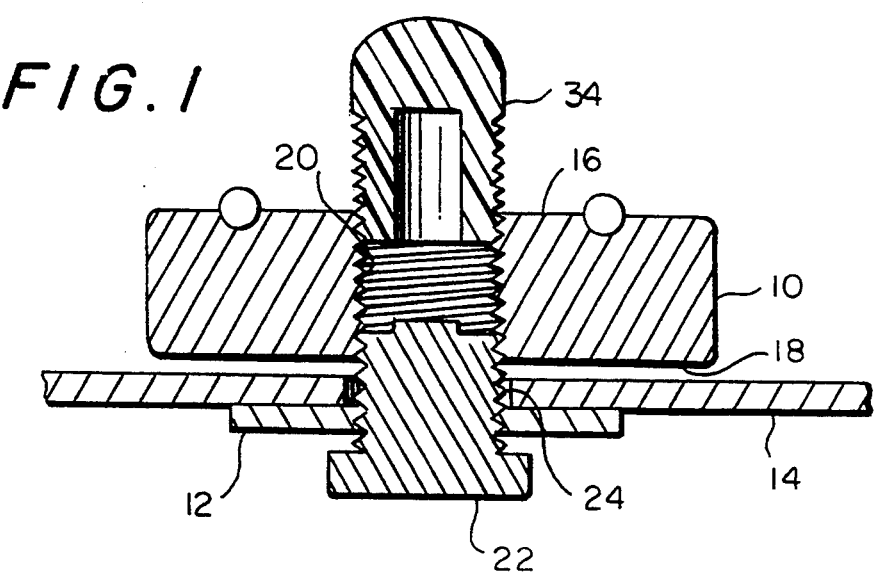
FIG. 1 is a sectional view of a preferred embodiment of a preplugged nut attaching a component to a vehicle panel in accordance with the present invention.

Referring to FIG. 1, a nut 10 is provided for fastening an attaching member, such as bracket 12, to a panel 14 of a vehicle for attaching accessory equipment or other panel members. The nut 10 has a body with a top surface 16 and a bottom surface 18 adjacent the panel 14 in the installed position. A central body opening 20 is provided for receiving a fastening member, such as a bolt or screw 22, which fastens the attaching member 12 to the vehicle panel 14. When installed, the nut 10 is positioned about an opening 24 in the vehicle panel 14 through which the fastening member 22 passes as it extends through the body opening 20 of the nut 10. The panel opening 24 may be a preexisting panel opening or may be formed as a result of attaching the nut 10 to the panel 14. Where the nut is a piercenut, there is no need for a pre-existing panel opening because the piercenut makes the opening.

Figure 3:
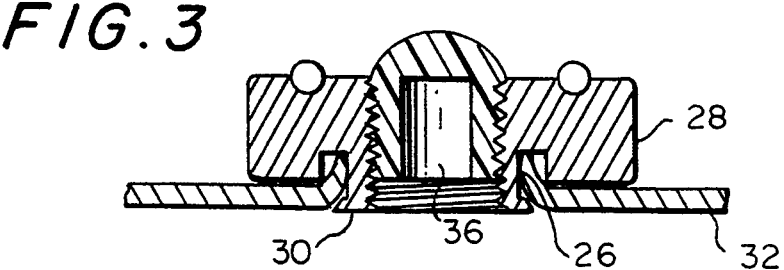
FIG. 3 is a sectional view illustrating engagement of the nut with a vehicle panel similar to FIG. 1, but illustrating another preferred embodiment.

Referring to FIG. 3, where there is a pre-existing panel opening 26, the nut 28 may have deformable flanges extending from the body of the nut through the opening 26 that are deformed against the opening and the surface of the vehicle panel 32 that is not in contact with the bottom of the nut 28. The flanges 30 would thereby attach the nut 28 to the vehicle panel 32 for mounting the attaching member or optional component directly. Alternatively, the nuts 10, 28 may be nuts which pierce the vehicle panel and attach themselves to the panel or may have other means for attaching to the panel.

Again referring to FIG. 1, because the nut 10 has the body opening 20, the vehicle panel 14 will be exposed to the atmosphere when the nut 10 is attached to the panel. A plug 34 is provided in the nut opening 20 for sealing the opening 20 and preventing moisture or other contaminants from deteriorating the vehicle panel 14 via the opening 20. The nut may also perform a piloting function for easy alignment of the optional component.

Referring to FIGS. 1 and 3, nuts 10, 28 illustrate the piloting function of the nut. When the nut 28 is formed, the plug 36 is inserted so that the open central area or bore of the plug is positioned to receive the end of a fastening member such as a bolt or screw 22. When it is desired to fasten the attaching member 12 to the vehicle panel 14, the fastening member 22 forces the plug 34 out of the opening 20, or the plug 34 may be removed before inserting the fastening member 22.

Figure 4:
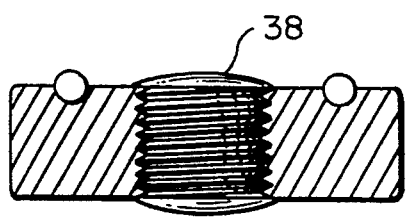
FIG. 4 is a sectional view of one of the nuts of FIG. 2 with a plug inserted.

Referring to FIG. 4, the plug 38 is an injected plug preferably formed of silicone or other heat resistant, pumpable sealer capable of resisting paint oven temperatures, electrodeposited paints and coatings, or other manufacturing materials and conditions that may cause the sealer to deteriorate. The top and bottom surfaces of the plug may be flush with the top and bottom surfaces of the nut or one or both may protrude a slight distance. The plug 38 is illustrated as a threaded plug but an unthreaded plug may be used also. A threaded plug is preferable because threads offer greater plug retention.

Figure 5:
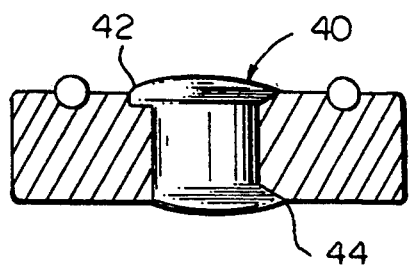
FIG. 5 is a view similar to FIG. 2 but illustrating another preferred embodiment.

FIG. 5 also illustrates an injected plug 40 which contains an offset portion 42 and a beveled portion 44 that are used to improve plug retention where the plug is unthreaded and the nut is either threaded or unthreaded. Preferably, the offset portion 42 of plug 40 seats in a groove, slot or annulus in the nut, but may rest on the top surface of the nut. Similarly, the plug bevel 44 seats in a groove, slot or annulus in the nut, but may rest on the bottom surface of the nut. While both the plug offset and beveled portions may be flat, cap-like members (see FIG. 6), the bevel creates a force tending to keep the plug seated. The bevel is therefore preferred for unthreaded nuts.

Figure 6:
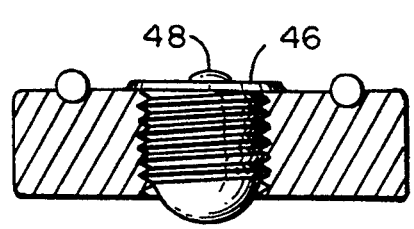
FIG. 6 is a view similar to FIGS. 4 and 5 but illustrating another preferred embodiment.

FIG. 6 illustrates a continuous loaded plug 46 that protrudes above the top surface of the nut. During manufacture, the continuous molded plugs 46 are attached by a carrier 48 to allow easy transport or storage in convenient rolls. The plugs may therefore be made in one facility and transported to another facility, or stored for later use. Plug 46 is threaded with a head or cap overlapping the top surface of the nut. The cap not only aids in sealing against moisture, but also facilitates removal of the plug when required. The plug 46 may also perform a piloting function for easy alignment of the optional component. When the nut is formed, the plug 46 is fully inserted so that the bottom end of the plug protrudes beyond the bottom surface of the nut and into the panel opening to help locate the nut on the panel 32. When it is desired to fasten the attaching member to the vehicle panel, the fastening member forces the plug out of the opening, or the plug may be removed before inserting the fastening member.

Figure 7:
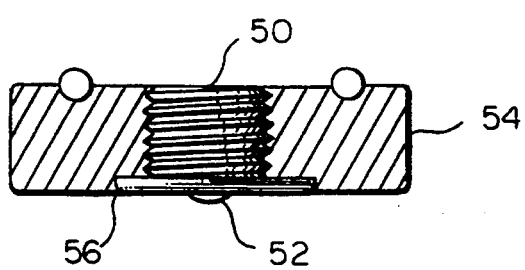
FIG. 7 is a view similar to FIGS. 4–6 but illustrating another preferred embodiment.

FIG. 7 is another example of a continuous molded plug 50 with a molded-in carrier 52. In this embodiment the nut 54 has a beveled groove or offset portion 56 that may be used to achieve flushness of the plug with the surface of the nut.

Figure 8:
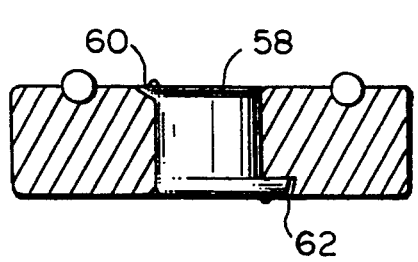
FIG. 8 is a view similar to FIGS. 4–7 but illustrating another preferred embodiment.

FIG. 8 illustrates a plug 58 with various beveled and offset portions 60, 62 that may be used for a threaded or unthreaded nut to improve retention. Here, the top portion of the nut has an annular bevel while the bottom portion has a beveled slot or groove. The bottom portion also has a recessed portion to accommodate an offset portion 62 of the plug 58.

Again referring to FIG. 3, in situations where the plug 36 is used to pilot the nut 28 onto the panel, the plug 36 substitutes for a pilot. In addition, the three exposed sides of the nut can be used to reference the part thereby making it useful for automated manufacturing.

Figure 2:
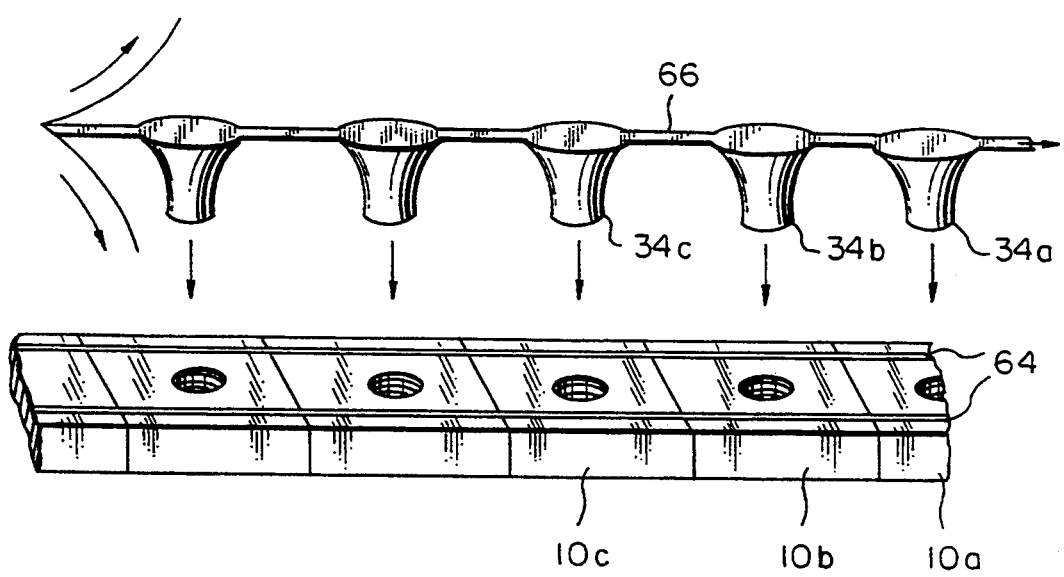
FIG. 2 is a diagram illustrating a coil of plugs ready for insertion into corresponding holes in a coil of nuts.

Referring now to FIG. 2, a plurality of nuts 10a, 10b, 10c, are formed and connected by a carrier 64 so that they may be wound in a coil for easy transport or storage until needed. Also, the plugs are formed in a continuous molding process where individual plugs 34a, 34b, 34c, are also bound together by a carrier 66 prior to insertion into the openings of the nuts.

Referring now to FIGS. 1 and 2, a method for forming nuts for fastening an attaching member to a panel of the vehicle comprises forming nuts 10a, 10b, 10c with each of the nuts having a body with top and bottom surfaces 16, 18 and a body opening 20 for receiving a fastening member 22 to fasten the attaching member 12 to the vehicle panel 14. The method includes forming attaching means on each nut body for attaching to the panel and fastening the body to the panel, attaching nuts to a carrier for dispensing one nut at a time, forming plugs, and inserting the plugs into the body openings of the nuts and sealing the body openings thereby to prevent ingress of moisture to the panel through the body openings after the nuts are installed. The method may also include inserting plugs into the nut body openings so that the plugs protrude from the nuts for engaging opening into the vehicle panel and piloting the nuts onto the panel.

Retaining the plug in the vehicle panel opening may be accomplished by forming an offset portion on the plug. Also, making each plug flush with the top and bottom surfaces of the nut is desirable in some applications. The plugs may be formed of a solid resin forced into the nut opening. Forcing may also be accomplished when the nut and plug are threaded and the plug has enough resiliency. The plugs are preferably formed of a resin or a sealer, such as silicone rubber or thermoplastic material. The piercenut can be sent to a panel stamping operation in coils with either a plastic plug (a continuous, molded plug is ideal) already inserted, or with a sealer injected in the hole. Both threaded and non-threaded piercenuts may be used, although the threaded piercenuts are better for retaining the plug. At assembly the plug is either pried out with a simple tool or the fastener can force the plug out of the opening.

Operation of the present invention is believed to be apparent from the foregoing description, but a few words will be added for emphasis. Ideally, the preplugged nuts are manufactured as needed at the location where used, but the nuts can be stored in rolls for later use or transported to another location. It is evident that the nuts and the plugs can be made separately and assembled prior to use or storage, whatever is convenient. Depending on the particular application, a nut with a flat head or flush head may be preferable. During automated assembly, the preplugged nut is attached to the vehicle panel. Later, when the nut is needed to attach a bracket or other component, the plug is forced out with the bolt that attaches the bracket or simply popped out with a screw driver or other tool. In those cases where the nut is not pre-installed, the nut may be installed manually by an operator who would then remove the plug to attach the bracket. If there is a delay due to plant shut down or other reason, the plug seals against contaminants until it is removed. When the nut is in an area of paint or sealer overspray, the plug protects the threads from the overspray. The plug thus offers an advantage in applications where water contamination is not a consideration.

It can now be appreciated that a preplugged nut has been presented that seals a wet area of a vehicle panel. The nut is ideal for sealing wet areas of a vehicle such as the underbody, cowl, dash and inside of b-pillars. The sheet metal frame of the vehicle has nuts installed during the stamping process at any location that may require optional equipment. The nut has a hole for the fastener which may or may not be used. If no optional equipment is installed on the vehicle and the location is considered a wet area or has passage to a wet area, the hole for the nut must be plugged. At the present time, the hole is plugged manually at assembly. The present invention provides a nut that is plugged prior to the assembly process. By plugging the nut prior to the panel assembly process, the need to manually plug the hole during assembly is eliminated. If the nut has to be used for attaching an accessory, the silicone rubber plug is easily removed during installation by the forward progress of a bolt or screw or with a simple tool. The piercenut is plugged at some point during the stamping process either by injection after the piercenut is stamped into the sheet or plugged prior to the stamping process so that the piercenut is plugged when it is stamped into the metal panel.

It can also be appreciated that there has been presented a method for forming a vehicle panel having a preplugged fastener for selectively attaching a vehicle component to the panel. The method comprises forming the vehicle panel with an area for attaching the fastener, forming a nut having a body with top and bottom surfaces and a body opening for receiving a fastening member to fasten the component to the panel, and forming attaching means on the nut body for attaching the nut to the panel. The step of forming a plug is performed before or simultaneously with forming the nut. The final steps are inserting the plug into the nut body opening of the nut and plugging the body opening to thereby prevent ingress of contaminants to the panel through the body opening after the nut is installed, and fastening the body to the panel with the attaching means after inserting the plug.

While the invention has been described with particular reference to the preferred embodiments, it will be understood by those skilled in the art that various changes may be made and equivalents may be substituted for elements of the preferred embodiments without departing from invention. For example, while the invention has been described with particular reference to a piercenut, other types of nuts can be used. A nut can be preplugged and welded to the vehicle panel when the plug material is selected to withstand welding temperatures. In addition, many modifications may be made to adapt a particular situation and material to a teaching of the invention without departing from the essential teachings of the present invention. For example, accessory or optional equipment such as a running board may be connected directly to the panel without using brackets.

As is evident from the foregoing description, certain aspects of the invention are not limited to the particular details of the examples illustrated, and it is therefore contemplated that other modifications and applications will occur to those skilled in the art. For example, the preplugged nuts may be installed during vehicle assembly on an as needed basis and the manufacturer will benefit by having the hole plugged until a component is installed which may be only a few minutes, but may be several days because of weekend, holiday or vacation shut down of a manufacturing plant. Also, if an optional item is not installed, the vehicle remains sealed to environmental moisture, dust, fumes and other contaminants during vehicle assembly and operation. It is accordingly intended that the claims shall cover all such modifications and applications as do not depart from the true spirit and scope of the invention.

What is claimed is:

1. A method for forming a vehicle panel having a preplugged fastener for selectively attaching a vehicle component to said panel, comprising the steps of:

forming said vehicle panel with an area for attaching said fastener to said vehicle panel;

forming a nut having a body with top and bottom surfaces and a body opening for receiving a fastening member to fasten said component to said panel;

forming attaching means on said nut body for attaching said nut to said panel;

forming a plug having first and second end portions;

forming a bevel portion on said second end portion of said plug for creating a force urging said bevel portion toward said first end portion of said plug to keep said plug seated when inserted in said body opening;

inserting said plug into said body opening of said nut and plugging said body opening to thereby prevent ingress of contaminants to said panel through said body opening when said nut is installed, positioning an opening of said plug for receiving an end portion of a fastener to pilot said vehicle component onto said vehicle panel, and fastening said nut body to said panel with said attaching means after inserting said plug.

2. A method for forming a vehicle panel having a preplugged fastener for selectively attaching a vehicle component to said panel, comprising the steps of:

forming said vehicle panel with an area for attaching said fastener to said vehicle panel;

forming a nut having a body with top and bottom surfaces and a body opening for receiving a fastening member to fasten said component to said panel;

forming attaching means on said nut body for attaching said nut to said panel;

forming a plug;

inserting said plug into said body opening of said nut and plugging said body opening to thereby prevent ingress of contaminants to said panel through said body opening when said nut is installed;

positioning said plug so that said plug protrudes from said nut for engaging an opening in said panel and piloting said nut onto said panel; and fastening said nut body to said panel with said attaching means after inserting said plug.

3. A method for forming a vehicle panel having a having a preplugged fastener for selectively attaching a vehicle component to said panel, comprising the steps of:

forming said vehicle panel with an area for attaching said fastener to said vehicle panel;

forming a nut having a body with top and bottom surfaces and a body opening for receiving a fastening member to fasten said component to said panel;

forming attaching means on said nut body for attaching said nut to said panel;

forming a plug having first and second end portions;

forming an offset portion on said first end portion of said plug for retaining said plug in said body opening;

forming a bevel portion on said second end portion of said plug for creating a force urging said bevel portion toward said first end portion to keep said plug seated when inserted in said body opening;

inserting said plug into said body opening of said nut and plugging said body opening to thereby prevent ingress of contaminants to said panel through said body opening when said nut is installed;

fastening said nut body to said panel with said attaching means after inserting said plug;

inserting a fastening member into said body opening of said nut and unseating said plug; and pushing said plug out of said body in response to inserting said fastening member.

* * * * *

UNITED STATES PATENT AND TRADEMARK OFFICE
CERTIFICATE OF CORRECTION

PATENT NO. : 5,446,957
DATED      : Sep. 5, 1995
INVENTOR(S) : Yitah R. Wu

It is certified that error appears in the above-identified patent and that said Letters Patent is hereby corrected as shown below:

```
Title page, item [54] and col. 1, line 3,
Add "NUT" to the end of the title as printed.
```

Signed and Sealed this

Second Day of January, 1996

Attest:

BRUCE LEHMAN

Attesting Officer

Commissioner of Patents and Trademarks